(12) United States Patent
Silverstein et al.

(10) Patent No.: US 11,934,649 B2
(45) Date of Patent: Mar. 19, 2024

(54) SCROLLABLE REAL-TIME PRESENTATION DOCUMENT TWIN

(71) Applicant: Kyndryl, Inc., New York, NY (US)

(72) Inventors: Michael Seth Silverstein, Jacksonville, FL (US); Caleb Miles, Columbia, MD (US); Zachary A. Silverstein, Georgetown, TX (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/682,260

(22) Filed: Feb. 28, 2022

(65) Prior Publication Data
US 2023/0273720 A1    Aug. 31, 2023

(51) Int. Cl.
*G06F 3/0485* (2022.01)
*H04L 65/1096* (2022.01)
*H04L 65/403* (2022.01)

(52) U.S. Cl.
CPC ........ *G06F 3/0485* (2013.01); *H04L 65/1096* (2013.01); *H04L 65/403* (2013.01)

(58) Field of Classification Search
CPC .. G06F 3/0485; H04L 65/1096; H04L 65/403
See application file for complete search history.

(56) References Cited

U.S. PATENT DOCUMENTS

| | | | |
|---|---|---|---|
| 9,146,615 B2 | 9/2015 | Scherpa | |
| 10,007,734 B2 | 6/2018 | Burns et al. | |
| 10,126,927 B1 * | 11/2018 | Fieldman | G06F 3/1454 |
| 10,382,498 B2 | 8/2019 | Xi et al. | |
| 10,788,963 B2 | 9/2020 | Quinn et al. | |
| 10,877,714 B2 | 12/2020 | Rajendran et al. | |
| 10,887,549 B1 * | 1/2021 | Wehrung | H04L 65/403 |
| 11,016,728 B2 | 5/2021 | Flores et al. | |
| 2006/0235927 A1 * | 10/2006 | Bhakta | G09B 5/06 709/204 |
| 2010/0131868 A1 | 5/2010 | Chawla et al. | |
| 2010/0257456 A1 * | 10/2010 | Lieb | G06Q 10/10 715/741 |
| 2013/0110937 A1 * | 5/2013 | Burns | H04L 65/4015 709/205 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Andrew T Chiusano
(74) *Attorney, Agent, or Firm* — Erik Swanson; Andrew M. Calderon; Calderon Safran & Cole P.C.

(57) ABSTRACT

A method includes: hosting, by a computing device, a videoconference among plural users; receiving, by the computing device, input from a sharing user of the plural users, wherein the input initiates a screenshare in the videoconference; creating, by the computing device, document twins of a document shown in the screenshare; and providing, by the computing device and to other users of the plural users, access to respective ones of the document twins in an interface of the videoconference; wherein each of the other users may scroll within a respective one of the document twins independently of other ones of the other users and independently of the screenshare.

15 Claims, 9 Drawing Sheets

(56) References Cited

U.S. PATENT DOCUMENTS

| | | | |
|---|---|---|---|
| 2014/0282013 A1* | 9/2014 | Amijee | G06F 3/0482 |
| | | | 715/732 |
| 2015/0058748 A1* | 2/2015 | Huang | G06F 3/0481 |
| | | | 715/753 |
| 2018/0331841 A1 | 11/2018 | Ross et al. | |
| 2019/0130046 A1* | 5/2019 | Oonishi | G06F 16/972 |
| 2020/0293261 A1* | 9/2020 | Janamanchi | H04L 12/1831 |
| 2021/0044645 A1* | 2/2021 | Jayaweera | H04L 65/80 |
| 2022/0116443 A1* | 4/2022 | Laukkanen | H04L 67/535 |
| 2022/0141532 A1* | 5/2022 | Li | H04N 21/44222 |
| | | | 725/14 |
| 2022/0360613 A1* | 11/2022 | Papisetty | G06F 40/169 |
| 2022/0385857 A1* | 12/2022 | Ittelson | H04N 7/155 |

OTHER PUBLICATIONS

White, "Ineffective Meetings Cost Companies Up to $283 Billion a Year (So Streamline Collaboration With These Tips)", https://www.inc.com/john-white/ineffective-meetings-cost-companies-up-to-283-billion-a-year-streamline-collaboration-with-these-tips.html, accessed Feb. 23, 2022, 16 pages.

Anonymous, "10 Best Video Conferencing Software For Remote Teams 2022", https://thedigitalprojectmanager.com/video-conferencing-software/, accessed Feb. 23, 2022, 30 pages.

Lowet et al, "Co-Browsing Dynamic Web Pages", https://www.researchgate.net/publication/221022021_Co-browsing_dynamic_web_pages, Apr. 20-24, 2009, 11 pages.

Anonymous, "Remote Viewer Navigation of a Live Online Presentation," IPCOM000142543D, IP.com, Nov. 1, 2006, 3 pages.

Anonymous, "Conference Appliance," IPCOM000203704D, IP.com, Jan. 31, 2011, 9 pages.

\* cited by examiner

SCROLLABLE REAL-TIME PRESENTATION DOCUMENT TWIN

BACKGROUND

Aspects of the present invention relate generally to viewing presentations in electronic meetings and, more particularly, to a scrollable real-time presentation document twin.

One type of electronic meeting is videoconferencing, which is the holding of a conference among people at remote locations by way of transmitted audio and video signals. Videoconferencing typically involves each user being connected to a videoconferencing server via their computing device. Video of the videoconference is displayed by each user's computing device, e.g., in an interface of the videoconference program. Audio of the videoconference is output by speakers included in or connected to each user's computing device. In some instances, a user computing device may include a camera for capturing video of the user and a microphone for capturing audio of the user, which is combined into the stream of the videoconference that is seen and heard by other users.

A common feature of videoconferencing is to share one's screen with other members of the videoconference. Using this feature, a user may show a document displayed in a window on their computing device to other users in the videoconference. The screenshare appears in the other users' videoconference interface.

SUMMARY

In a first aspect of the invention, there is a computer-implemented method including: hosting, by a computing device, a videoconference among plural users; receiving, by the computing device, input from a sharing user of the plural users, wherein the input initiates a screenshare in the videoconference; creating, by the computing device, document twins of a document shown in the screenshare; and providing, by the computing device and to other users of the plural users, access to respective ones of the document twins in an interface of the videoconference, wherein each of the other users may scroll within a respective one of the document twins independently of other ones of the other users and independently of the screenshare.

In another aspect of the invention, there is a computer program product including one or more computer readable storage media having program instructions collectively stored on the one or more computer readable storage media. The program instructions are executable to: host a videoconference among plural users; receive input from a sharing user of the plural users, wherein the input initiates a screenshare in the videoconference; create document twins of a document shown in the screenshare; and provide, to other users of the plural users, access to respective ones of the document twins in an interface of the videoconference, wherein each of the other users may scroll within a respective one of the document twins independently of other ones of the other users and independently of the screenshare, and the document twins are ephemeral and read-only.

In another aspect of the invention, there is system including a processor, a computer readable memory, one or more computer readable storage media, and program instructions collectively stored on the one or more computer readable storage media. The program instructions are executable to: host a videoconference among plural users; receive input from a sharing user of the plural users, wherein the input initiates a screenshare in the videoconference; create document twins of a document shown in the screenshare; and provide, to other users of the plural users, access to respective ones of the document twins in an interface of the videoconference, wherein each of the other users may scroll within a respective one of the document twins independently of other ones of the other users and independently of the screenshare, and the document twins are ephemeral and read-only.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
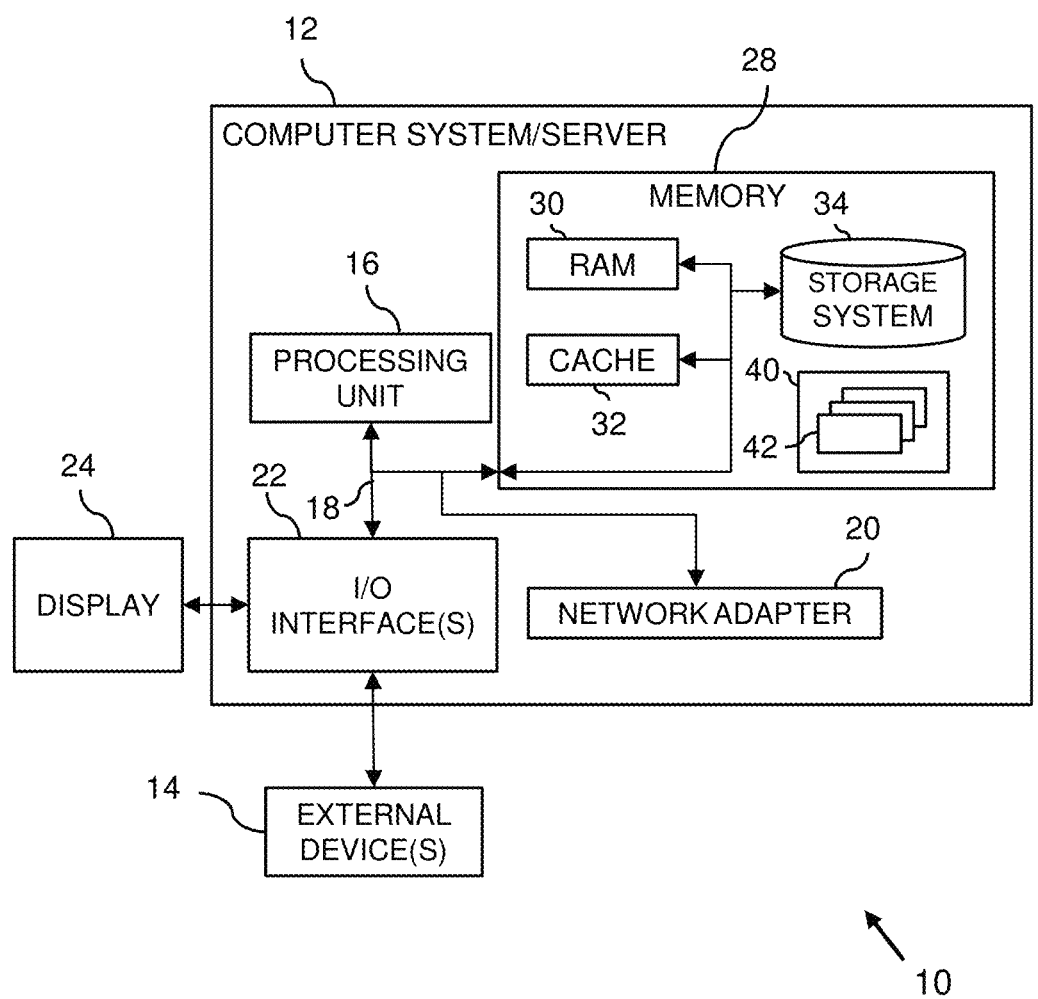
FIG. 1 depicts a cloud computing node according to an embodiment of the present invention.

Aspects of the present invention relate generally to viewing presentations in electronic meetings and, more particularly, to a scrollable real-time presentation document twin. When viewing a real-time presentation of a document in a screenshare during a videoconference, the users viewing the presentation are limited to seeing only what is currently included in the screenshare, i.e., the portion of the document that is shown by the user performing the screenshare. A problem arises when one of the viewers wants to read another portion of the document that is not currently shown in the screenshare. A common situation is that one of the viewers asks the user screensharing the document to go backward or forward to a certain page or section of the document. This involves manual action and interaction, and results in jumping back and forth within the screenshared document during the videoconference. This jumping back and forth during the videoconference is a problem because it consumes time (i.e., is an inefficient use of all the users' time) and because some users may not wish to see the part of the document being requested by one of the other users.

Aspects of the invention address this problem by providing a scrollable, real-time presentation document twin within which each user in a videoconference may navigate independently of the other users in the same videoconference. In embodiments, when a user in a videoconference screenshares a document with other users in the videoconference, the other users are each provided with a document twin of the screenshared document that they can scroll through at their own pace. In embodiments, the other users may scroll forward and backward in the document twin to view portions of the document that are not currently shown by the screenshare. In this manner, the other users are not limited to viewing only the portion of the document that is currently shown in the screenshare. In embodiments, the document twin is ephemeral in that it is only accessible by the other users during the videoconference, and more specifically during a time in the videoconference controlled by the user that shared the document in the screenshare. In embodiments, the document twin is read-only, meaning that the other users cannot save a copy of the document twin and cannot edit the document twin. Making the document twin ephemeral and read-only provides security to the user who screenshares the document by providing that user with control to prevent unwanted distribution and/or editing of the document.

Implementations of the invention provide a system and method that creates a read-only, opted-in version of a document hosted by a user during a live screenshare. Embodiments provide the ability to skip back to a live feed of the user's presentation screen easily and follow along with them. Embodiments also provide for capturing user viewing metrics during the presentation to capture what components users are viewing during the screenshare and live or recorded session.

Implementations of the invention include creating a digital document twin with interconnected webhooks to a screenshared document. Implementations include shared highlighting based on the user's viewing and cursor. In embodiments, a user opts-in to the inventive sharing using the document twin. In embodiments, the system captures a user's decision of allowing the document to be independently viewed by other users. In embodiments, a document byte stream of the base document is provided to a cloud-based module that serves up a connected preview (e.g., read-only) version of the screenshared document. In embodiments, the client document twin maintains webhooks with a web-based screenshare server retrieving four sets of (X, Y) coordinates on a given document of the subsection shown during the base screenshare. In embodiments, the client document twin provides visual feedback of the portion screenshared by the host, while also remitting viewing metrics of the user for analytics post-processing.

In accordance with an aspect of the invention, there is a computer-implemented method including: creating a read-only, opted-in version of a document hosted by a user during a live screenshare; and providing a mechanism (e.g., a snap back to live version after scrolling back to a previous slide) to skip back to a live feed of a user presenting content (e.g., a user's presentation screen). In embodiments, the method includes capturing user viewing metrics during a presentation to capture what components users are viewing during the screenshare and live or recorded session.

Implementations of the invention provide an improvement in the technical field of electronic meetings and more particularly videoconferencing. It is estimated that ineffective meetings cost companies up to $283 billion annually. Implementations improve meeting efficiency by improving how people work together through the ability to individually navigate a document being screenshared and reducing questions while the speaker is presenting or talking. This improves the meeting efficiency by allowing a larger number of people to discover content on demand during a live dynamic session.

It should be understood that, to the extent implementations of the invention collect, store, or employ personal information provided by, or obtained from, individuals (for example, metrics about navigation within a document twin) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
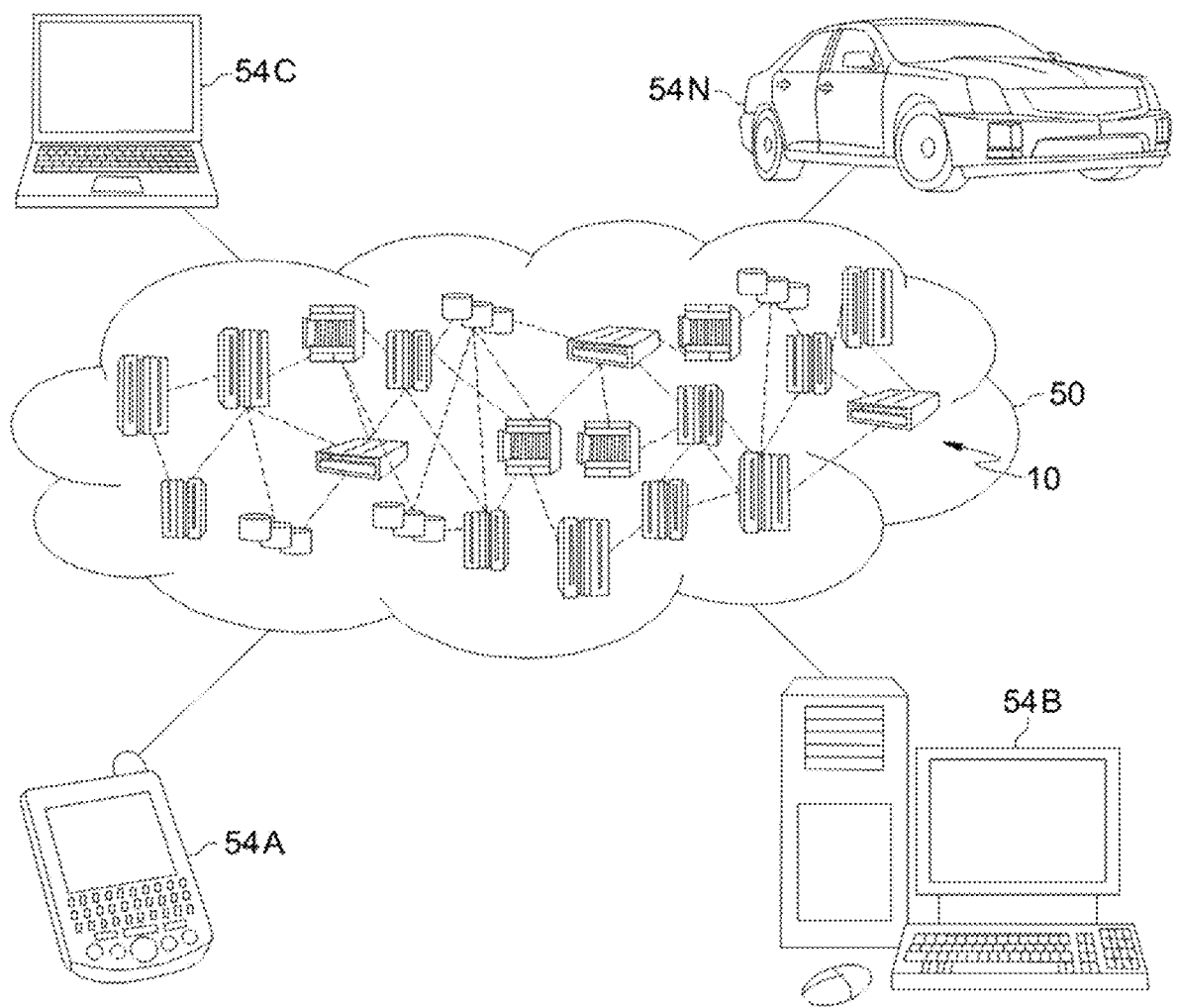
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
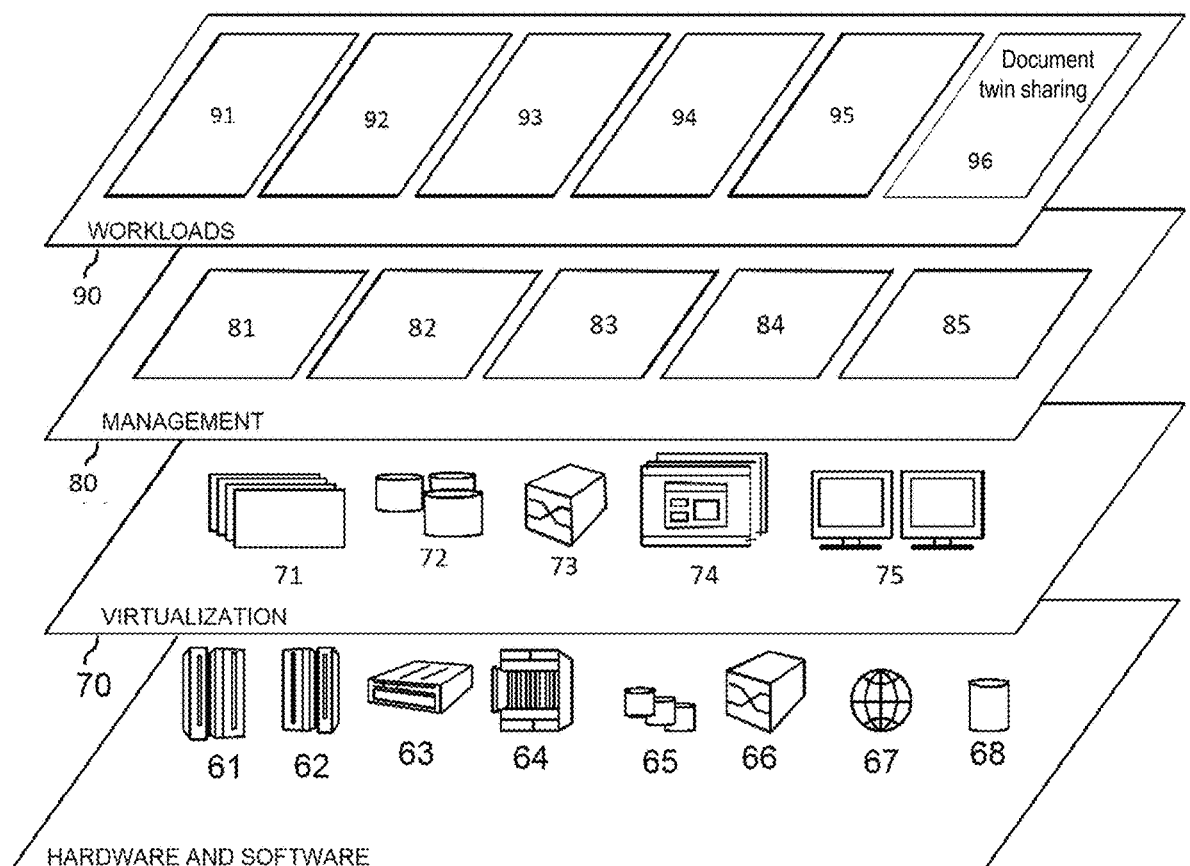
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document twin sharing 96.

Implementations of the invention may include a computer system/server 12 of FIG. 1 in which one or more of the program modules 42 are configured to perform (or cause the computer system/server 12 to perform) one of more functions of the document twin sharing 96 of FIG. 3. For example, the one or more of the program modules 42 may be configured to: host a videoconference among plural users; receive input from a sharing user of the plural users, wherein the input initiates a screenshare in the videoconference; create document twins of a document shown in the screenshare; and provide, to other users of the plural users, access to respective ones of the document twins in an interface of the videoconference.

Figure 4:
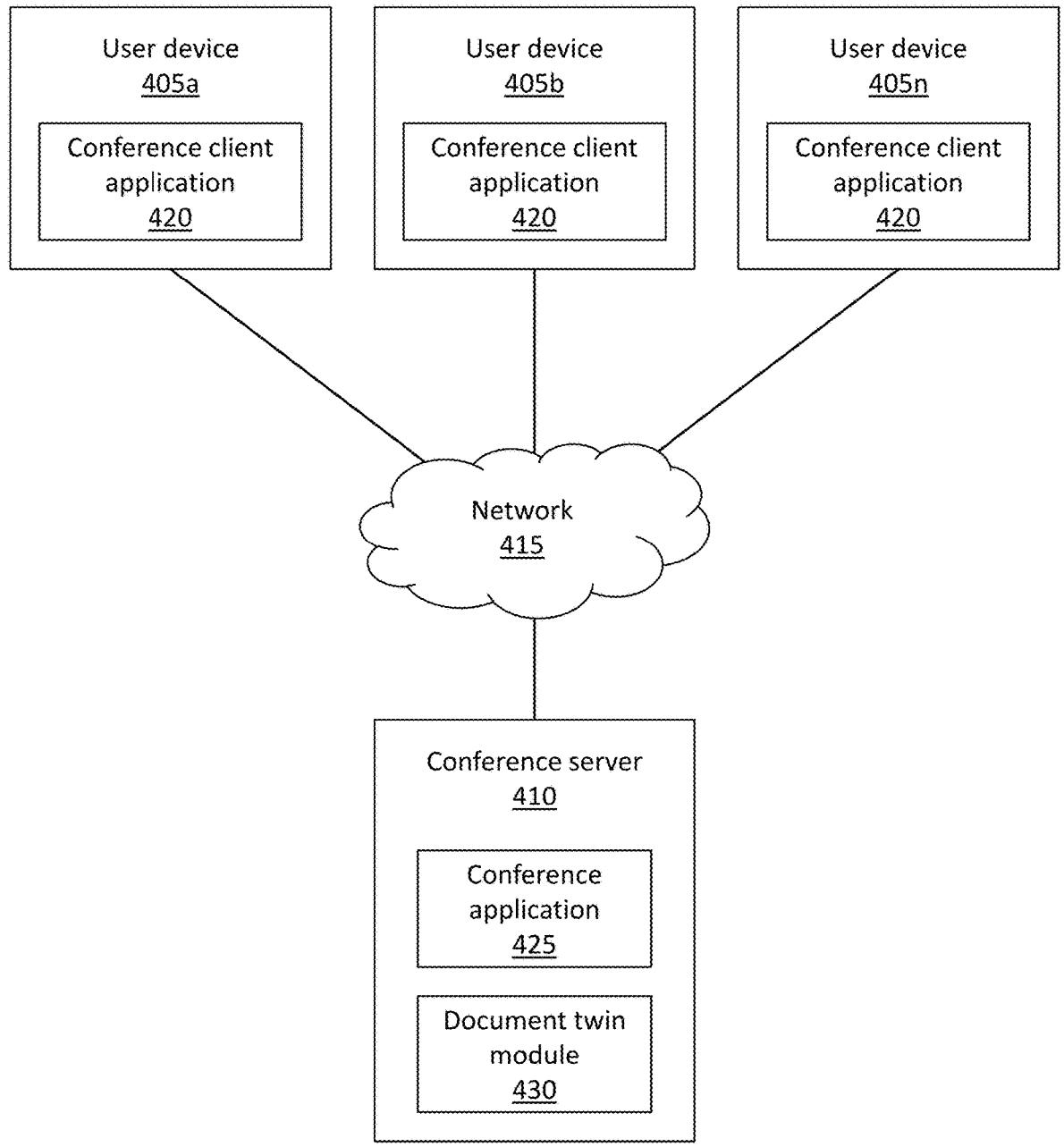
FIG. 4 shows a block diagram of an exemplary environment in accordance with aspects of the invention.

FIG. 4 shows a block diagram of an exemplary environment in accordance with aspects of the invention. In embodiments, the environment includes plural user devices 405*a-n* and a conference server 410 connected to a network 415. The network 415 comprises one or more communication networks such as one or more of a LAN, WAN, and the Internet. Each of the user devices 405*a-n* comprises a computing device such as a smartphone, tablet computer, laptop computer, desktop computer, etc., and may comprise one or more elements of the computer system 12 of FIG. 1. In embodiments, each of the user devices 405*a-n* comprises a conference client application 420, which may comprise a software application such as a program/utility 40 of FIG. 1.

In embodiments, the conference server 410 comprises one or more computing servers each comprising one or more elements of computer system 12 of FIG. 1. In other embodiments, the conference server 410 comprises one or more virtual machines or one or more containers running on one or more computing servers. In a cloud embodiment, the network 415 comprises the cloud computing environment 50 of FIG. 2, the conference server 410 comprises one or more nodes 10, and the user devices 405*a-n* comprise computing devices 54A-N.

In embodiments, the conference server 410 comprises a conference application 425 which may comprise a software application such as a program/utility 40 of FIG. 1. In embodiments, the conference server 410 comprises a document twin module 430, which may comprise one or more program modules such as program modules 42 described with respect to FIG. 1. The conference server 410 may include additional or fewer programs and modules than those shown in FIG. 4. In embodiments, separate programs or modules may be integrated into a single program or module. Additionally, or alternatively, a single program or module may be implemented as multiple programs or modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the conference application 425 comprises a videoconferencing application that communicates with respective instances of the conference client application 420 on the user devices 405a-n to provide videoconferencing services and functionality to the users of the user devices 405a-n. For example, the conference application 425 may receive audio and video signals from each of the user devices 405a-n and generate a conference audio/video stream for output at each of the user devices 405a-n so that the users of the user devices 405a-n can participate in real-time videoconferencing. In embodiments, the conference application 425 is configured to permit a user of one of the user devices (e.g., 405a) to share their screen with users of the other user devices (e.g., 405b-405n) during the real-time videoconferencing. For example, a first user may opt to share their screen showing a word-processing document, and the other users in the videoconference can see the screenshared portion of the word-processing document in a user interface of the conference client application 420 on their respective devices.

In accordance with aspects of the invention, when a user initiates screensharing of a document via their user device (e.g., 405a) during a videoconference, the document twin module 430 is configured to create a scrollable, real-time document twin of the screenshared document for each of the other user devices (e.g., 405b-405n) in the videoconference. In embodiments, each user may utilize their user device (e.g., 405b-405n) to scroll forward and backward in their document twin to view portions of the document that are not currently shown by the screenshare. In embodiments, each user may utilize their user device (e.g., 405b-405n) to scroll through their document twin independently of the other users. In this manner, each user may navigate within their document twin at their own pace, with the result that users will not need to ask the sharing user (also called the presenter) to move backward or forward to another location in the screenshared document, which is a problem that is present in conventional screensharing in videoconferencing.

In one exemplary embodiment, all participants of a videoconference opt-in to using the document twin sharing, e.g., via the conference client application 420 on their respective user devices 405a-n. In this embodiment, one of the participants of the videoconference (i.e., the sharing user) provides input to screenshare a portion of a document in the videoconference interface. In this embodiment, the sharing user provides input that they wish the other users to be provided with access to document twins of the screenshared document. In this embodiment, the other users' user devices receive a byte stream representative of the screenshared document. In this embodiment, responsive to receiving the byte stream, the system determines if the byte stream source is a document that is readable and capable of being rendered in a preview format (e.g., based on the application of the document). In this embodiment, responsive to determining the document is readable and capable of being rendered in a preview format, the system renders the document twin at the other user devices, e.g., in the videoconference interface and similar to a preview of a document in a previewing application. In this embodiment, the system maintains client-to-server webhooks that receive a processed form of the video feed of the screenshare of the sharing user. In this embodiment, the sharing user's device provides (X, Y) coordinates to the conference server 410 to remit to the other users viewing the document twins. In embodiments, the other users' conference client applications 420 retrieve the webhook (X, Y) coordinates periodically and render a block understood to be the content of the screenshare. In embodiments, the system additionally captures analytics based on what portions of the digital document the other users view during the videoconference, e.g., at different timestamps, so that feedback may be provided to the sharing user in an anonymized or non-anonymized manner.

Figure 5A:
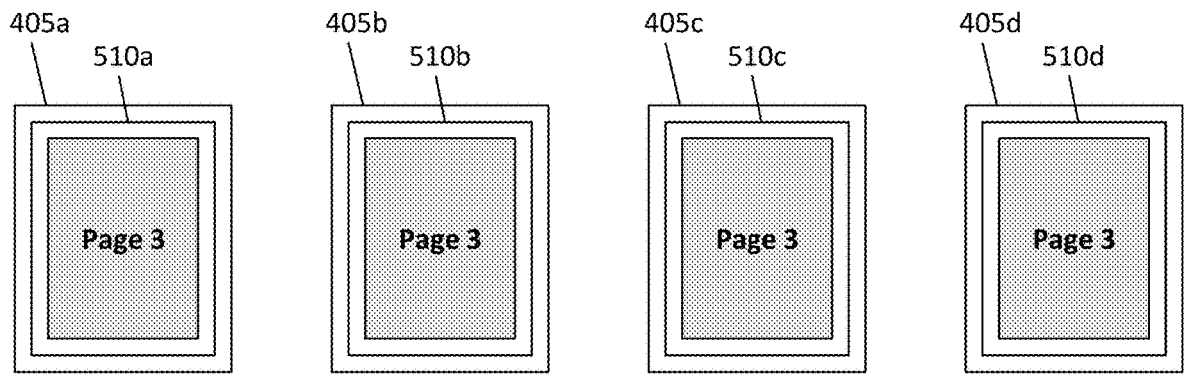
FIGS. 5A-C illustrate an exemplary use case in accordance with aspects of the invention.
Figure 5B:
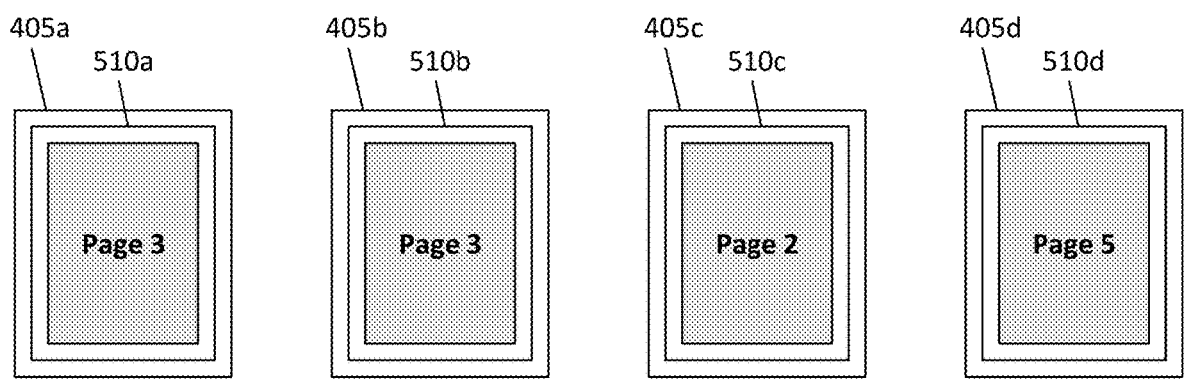
Figure 5C:
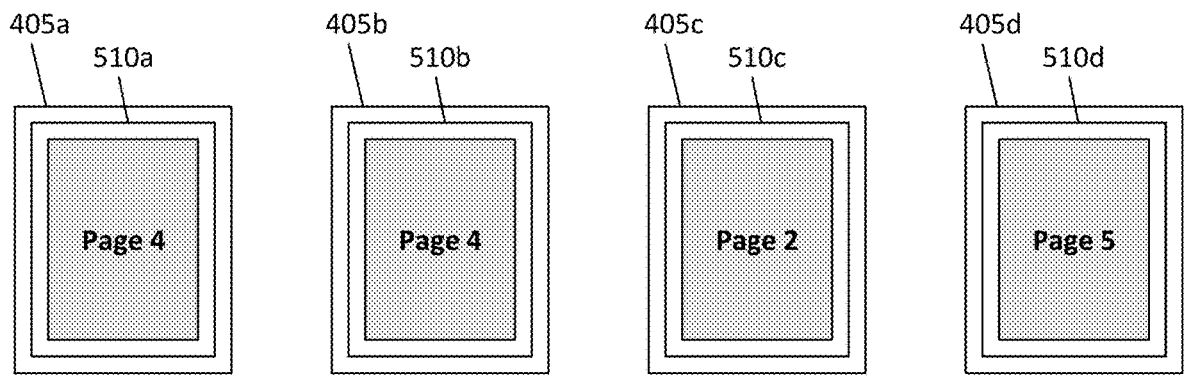

FIGS. 5A-C show an exemplary use case that illustrates aspects of the embodiments of the invention. FIG. 5A shows a first time during which users of user devices 405a, 405b, 405c, 405d are participating in a videoconference, with each other, using the conference client application 420 on their respective devices and the conference application 425 on the conference server 410. In this example, each of the user devices 405a, 405b, 405c, 405d includes a respective display 510a, 510b, 510c, 510d that can comprise a conventional computing device display such as an LCD (liquid crystal display). In this example, the user of user device 405a provides input to an interface of the conference client application 420 to screenshare content with the other users (also called participants) of the videoconference. In this example, the screenshared content is Page 3 of a document that is currently displayed in an interface on the display 510a. In this example, as a result of this input by the user of user device 405a, this screenshared content (i.e., Page 3) is shown in an interface of the client application 420 output by displays 510b, 510c, 510d of the other user devices 405b, 405c, 405d, as shown in FIG. 5A.

FIG. 5B continues the example at a second time after the first time. In FIG. 5B, the sharing user (e.g., the user of user device 405a) controls the screenshare to remain on Page 3 of the document. In this example, the user of user device 405b provides no input to navigate their document twin away from what is shown by the screenshare, such that the display 510b shows the same content as the screenshare, e.g., Page 3. In this example, the user of user device 405c provides input to the conference client application 420 to navigate backward to Page 2 of their document twin such that the display 510c shows Page 2, which is different than what is currently being screenshared by the sharing user. In this example, the user of user device 405d provides input to the conference client application 420 to navigate forward to Page 5 of their document twin such that the display 510d shows Page 5, which is different than what is currently being screenshared by the sharing user.

FIG. 5C continues the example at a third time after the second time. In FIG. 5C, the sharing user changes the content of the screenshare to show Page 4 of the document. In this example, the user of user device 405b sees the screenshared content move to Page 4 since they have elected to remain on the same page as the sharing user. In this example, the user of user device 405c remains on Page 2 because they are navigating their document twin independently from what is currently being screenshared by the sharing user, and the user of user device 405d remains on Page 5 because they are navigating their document twin independently from what is currently being screenshared by the sharing user.

In conventional videoconferencing, the screenshared content shown at the other user devices is confined to the exact same content that is being screenshared by the sharing user. For example, if the sharing user is controlling the screenshare to show page 3 of a document, then all other users are shown page 3 of the document. When the sharing user controls the screenshare to move to page 4 of the document, then all other users are shown page 4 of the document. In this manner, in conventional videoconferencing the other users cannot navigate away from the content that is being shown in the screenshare by the sharing user. As a result, if one of the other users wants to see a different page than what is being shown in the screenshare, then that other user must ask the sharing user to navigate the screenshare to the desired content. For example, while the sharing user is screensharing page 4, another user might ask the sharing user to go back to page 2. If the sharing user complies and goes back to page 2, then all users are shown page 2 because that is what is being shown by the sharing user. This is a problem because it can disrupt the meeting plan of the sharing user and degrade from the efficiency of the meeting, which can result in suboptimal use of time by all participants of the videoconference.

As illustrated in FIGS. 5A-C, implementations of the invention address this problem of conventional videoconferencing by providing each participant with a document twin of the shared content, where each participant can navigate within their document twin independently of the sharing user and independently of other users. In embodiments, when a sharing user (e.g., a user of user device 405a) provides input to an interface of the conference client application 420 to screenshare a portion of a document with the other users of the videoconference, the document twin module 430 creates a document twin of the entire document. In embodiments, the document twin module 430 creates a respective document twin of the entire document for each other participant of the videoconference (e.g., users of the other user devices 405b, 405c, 405d). In embodiments, for each participant, the document twin module 430 maintains the respective document twin on the conference server 410 and permits the conference client application 420 to access the document twin in a read-only manner. In this way, the document twin may be displayed and navigated in the interface of the conference client application 420 in a preview manner that permits only viewing and navigating (e.g., scrolling up and down), and that does not permit editing such as selecting text, copying, and saving.

In embodiments, the document twin module 430 maintains data, in real-time, that defines a portion of the document that is currently shown in the screenshare of the sharing user. The document twin module 430 may obtain this data using a byte stream from the conference client application 420 of the sharing user. In embodiments, the document twin module 430 maintains data, in real-time, that defines a portion of the document twin that is currently shown in the interface of the conference client application 420 of another participant. In embodiments, by comparing this data in real-time, the document twin module 430 is configured to provide a visual indicator in the interface of the conference client application 420 of the participant, the visual indicator identifying the portion of the document that is currently shown in the screenshare of the sharing user relative to the portion of the document twin that is currently shown in the interface of the conference client application 420 of the participant. In embodiments, by comparing this data in real-time, the document twin module 430 is also configured to provide a user control that causes the participant document twin to 'snap back' to the portion of the document that is currently shown in the screenshare of the sharing user. The maintaining of the data and comparing the data may be performed using web hooks to the document being screenshared by the sharing user. The document twin module 430 may use web hooks to receive push notifications when the sharing user changes the portion of the document that is shown in the screenshare. The notifications can include (X, Y) coordinates defining a portion of the document that is currently shown in the screenshare.

Figure 6A:
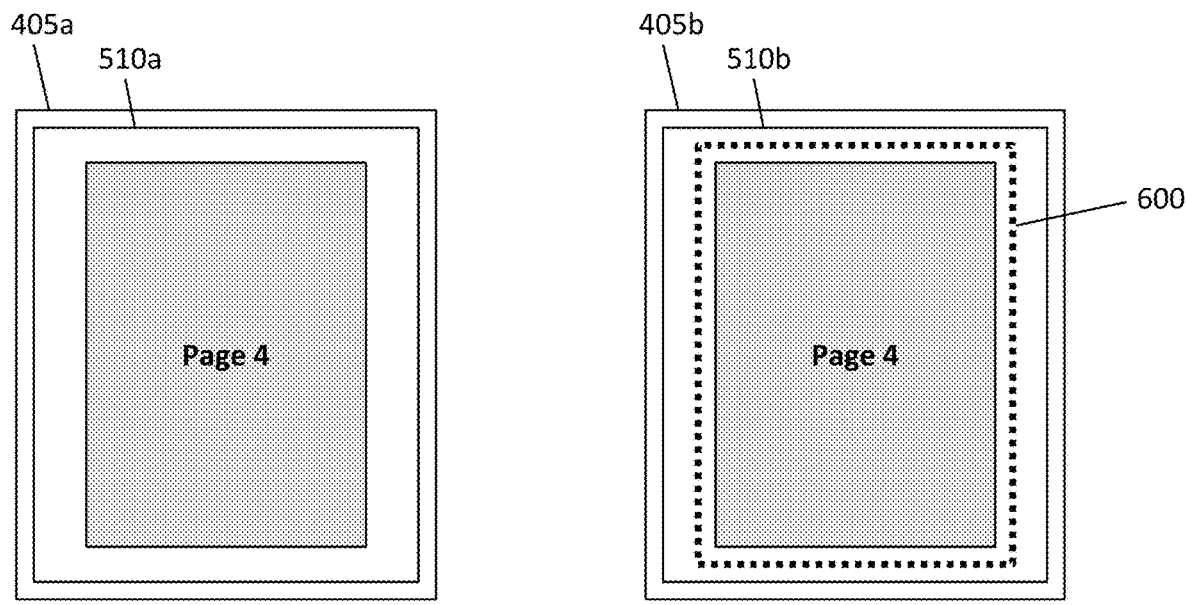
FIGS. 6A-B illustrate an exemplary use case in accordance with aspects of the invention.
Figure 6B:
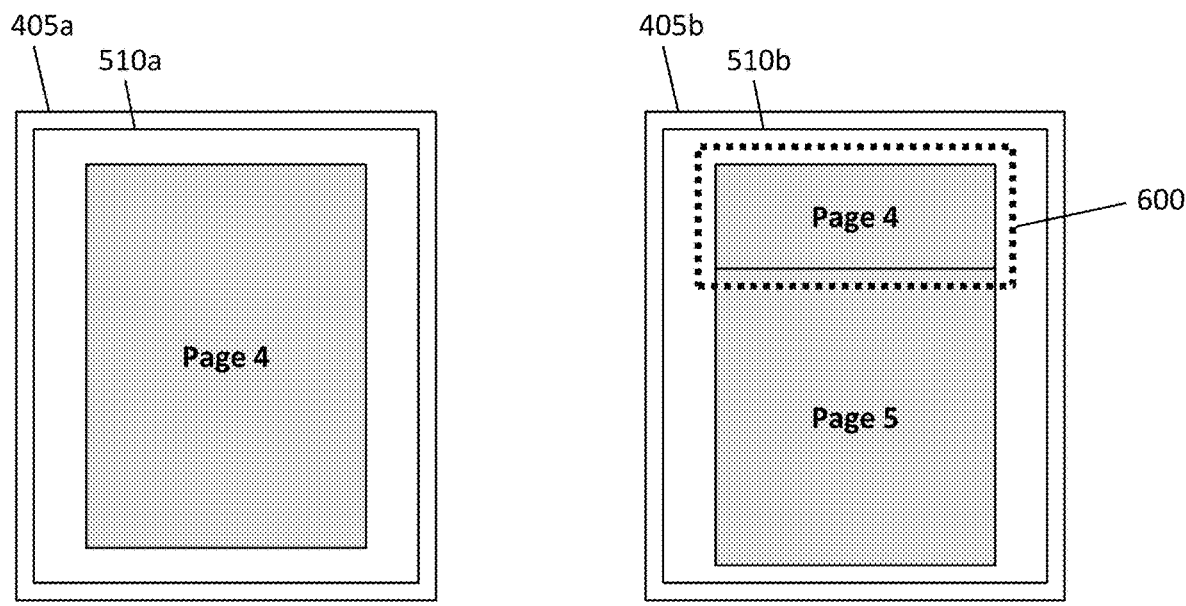

FIGS. 6A and 6B show an exemplary use case of an embodiment that illustrates the visual indicator of overlapping content. As shown in FIG. 6A, the sharing user (e.g., the user of user device 405a) is screensharing Page 4 of a document during the videoconference. Still referring to FIG. 6A, another participant in the same videoconference (e.g., the user of user device 405b) has navigated their document twin to Page 4, resulting in the document twin module 430 communicating with the conference client application 420 to cause the display of a visual indicator 600 that identifies on the user device 405b what portion of the content is currently screenshared by the user device 405a. Continuing this example in FIG. 6B, the user of user device 405b provides input to scroll their document twin forward toward Page 5, such that their device displays some of Page 4 and some of Page 5. In the example of FIG. 6B, because the screenshare on the user device 405a is still on Page 4, the visual indicator 600 shown on the user device 405b is changed to identify only the portion of Page 4 that is shown on the user device 405b. In this example, if the user of user device 405b provides input to scroll their document twin so that no portion of Page 4 is showing, then the visual indicator 600 disappears entirely since there is no overlap between what is being shown at user device 405b and what is being screenshared by user device 405a. In this manner, implementations of the invention provide the other users with a visual cue (i.e., the visual indicator 600) of the screenshare relative to the document twin. This can be helpful for a participant who has navigated their document twin away from the screenshare to be able to identify the content of the screenshare for the purpose of following along with the presentation by the sharing user.

Figure 7A:
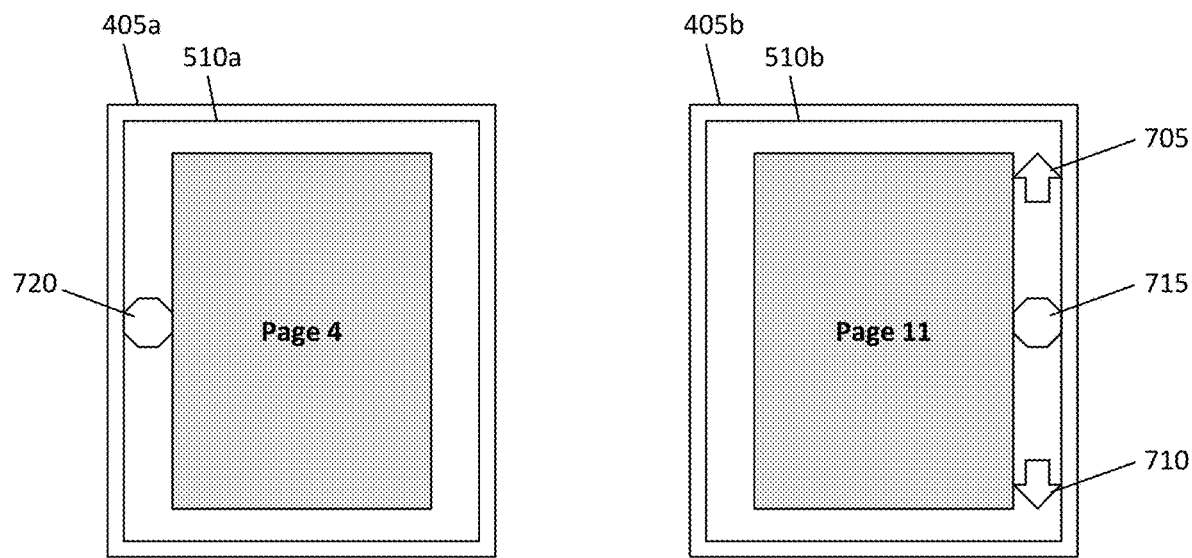
FIGS. 7A-B illustrate an exemplary use case in accordance with aspects of the invention.
Figure 7B:
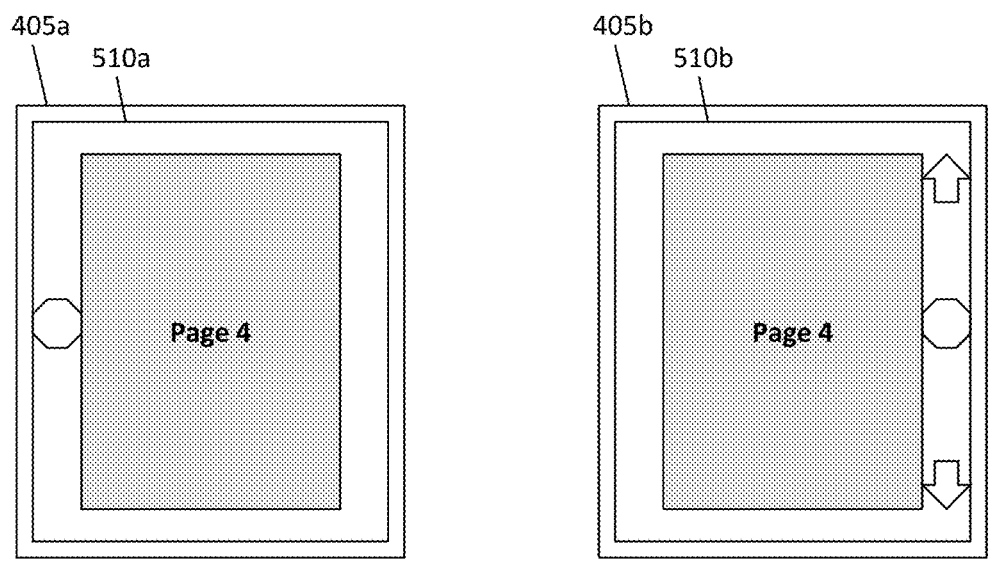

FIGS. 7A and 7B show an exemplary use case of an embodiment that illustrates a snap back function. As shown in FIG. 7A, the sharing user (e.g., the user of user device 405a) is screensharing Page 4 of a document during the videoconference. Still referring to FIG. 7A, another participant in the same videoconference (e.g., the user of user device 405b) has navigated their document twin to Page 11. In embodiments, the interface of the conference client application 420 includes controls 705 and 710 for navigating (e.g., scrolling) forward and backward within the document twin that is displayed in the interface. The controls 705, 710 can take any suitable form (such as digital objects that can be selected using a cursor or touch screen input), and user input to the controls causes the conference client application 420 to communicate with the document twin module 430 to adjust the viewable portion of the document twin within the interface of the conference client application 420. In embodiments, the interface of the conference client application 420 includes a control 715 that causes the document twin shown on this particular device (e.g., user device 405b) to snap back to the same content that is currently shown in the screenshare of the sharing user (e.g., user device 405a). The control 715 can take any suitable form (such as a digital object that can be selected using a cursor or touch screen input), and user input to the control 715 causes the conference client application 420 to communicate with the document twin module 430 to cause the viewable portion of the document twin within the interface of the conference client application 420 to be identical to that currently shown in the screenshare of the sharing user. For example, as shown in FIG. 7A the user of user device 405b is viewing Page 11 of their document twin while the screenshare is showing Page 4. In this example, the user of user device 405b can provide input to the control 715, with the result being that their document twin is immediately navigated to the same content that is currently shown in the screenshare, e.g., Page 4 in this example as shown in FIG. 7B. This can be helpful for a participant who has navigated their document twin away from the screenshare to be able to immediately return to the screenshare for the purpose of following along with the presentation by the sharing user.

Still referring to FIGS. 7A and 7B, in embodiments the conference client application 420 includes a control 720 in the interface of the sharing user (e.g., of user device 405a in this example) that causes all the document twins of all the videoconference participants to snap back to the portion of the document that is currently shown in the screenshare of the sharing user. In embodiments, the control 715 causes the document twin of an individual participant to snap back, while the control 720 causes all the document twins of all the videoconference participants to snap back. In this manner, the sharing user can force all the other users' document twins to snap back to the screenshare, for example, when the sharing user wants everyone's attention on an important topic in the screenshare. In embodiments, after all the document twins snap back to the screenshare, the document twin module 430 controls the document twins to permit the other users to again navigate freely within their respective document twins.

Figure 8:
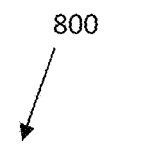
FIG. 8 shows exemplary pseudocode in accordance with aspects of the invention.

FIG. 8 shows an example of pseudocode 800 that can be used with the document twin module 430 to provide the snap back function as described herein. The pseudocode 800 assumes that the vertical (e.g., Y) coordinates are the only constraint on what portion of the document is shown by the sharing user and what portion of the document twin is viewed by the other user (e.g., participant). However, the pseudocode may be adapted to include a horizontal (e.g., X) coordinate in addition to the vertical coordinate.

In the pseudocode 800, each of "env.pageBuffer" and "env.coordBuffer" is an exposed variable modified by the sharing user when they select an option to share a last "n" viewed screens or have the ability to scroll "n" many pixels. In the pseudocode 800, "digitalTwinSS" is a document twin screenshare object that has all of the history of the screenshare session at time T. In embodiments, a final summarization function provides a maximum and minimum across all of the allowed timings and allows those to be the standout values. In embodiments, a version of the algorithm in the pseudocode 800 can be ingested in the viewing privileges to determine a 'snapback ability' for a given user.

In embodiments, a participant of a videoconference that starts screenshare in the videoconference has the option of permitting the other participants to have a document twin of the screenshared document, or to perform the screenshare in a conventional manner (i.e., without document twins). In embodiments, when the sharing user elects to permit the other participants to have access to a document twin, a respective document twin for each participant is hosted in a cloud environment (e.g., at conference server 410) and is not stored on the other users' machines (e.g., at user devices 405b-n). This gives the sharing user control over distribution of the document.

In accordance with aspects of the invention, the document twin module 430 is configured to provide the sharing user with one or more additional controls over the document twins during the videoconference. In embodiments, one such control is a user-defined number of pages that the other users can navigate away from the page currently shown in the screenshare by the sharing user. For example, if the sharing user defines this value to be 3 pages, then the document twin module 430 restricts the other users from navigating in their document twin to a location that is more than 3 pages ahead of or behind the page currently shown in the screenshare by the sharing user. For example, if the sharing user defines this value to be 3 pages and the sharing user is currently showing page 7 in the screenshare, then the other users can navigate their document twins to pages within a range defined by page 7 plus or minus 3 pages (within pages 4 through 10 in this example), but cannot navigate their document twin to pages outside the range defined by page 7 plus or minus 3 pages (i.e., outside of pages 4 through 10 in this example).

In embodiments, another such control is a user-defined amount of time that is used to limit the other users' navigation within their document twins. In embodiments, the document twin module 430 maintains time data associated with the screenshare, including respective time values corresponding to when each page of a document is shown in the screenshare. In embodiments, the document twin module 430 permits participants to navigate backwards in their document twin to any page that was shown in the screenshare in a range of time defined between a current time and the current time minus the user-defined amount of time. In embodiments, the document twin module 430 prevents participants from navigating backwards in their document twin to any page that was shown in the screenshare outside the range of time defined between the current time and the current time minus the user-defined amount of time. For example, if the sharing user defines the user-defined amount of time as 5 minutes, then based on this the other users can navigate their document twins to any pages that were shown in the screenshare in the last 5 minutes, and cannot navigate their document twin to pages that were not shown in the screenshare within the last 5 minutes. This may be useful, for example, by a sharing user that wants to keep the other users focused on the content of the screenshare but that lets participants go back to something they might have recently missed. For example, a student might be permitted to go back to pages shown within the last 5 minutes during a lecture presentation by a professor, but not to pages that were shown more than 5 minutes ago. This allows the professor to keep everyone in the moment of the current discussion, while still allowing the students to go back a page or two in case the student needs to review a recent slide for personal note taking. In embodiments, the user-defined time can be adjusted based on user preferences (e.g., by the sharing user), and can be defined by providing input to the conference client application 420 before or during the videoconference. In one particular example of this function, the sharing user may set the user-defined amount of time to 'start,' and this allows the other users to navigate their document twin backward to any page that has already been shown in the screenshare, while preventing the other users from navigating their document twin forward to any page that has not yet been shown in the screenshare.

In embodiments, another such control comprises the sharing user providing input to the interface of the conference client application 420 to selectively turn on and off (e.g., toggle on and off) the document twin function during a screenshare in the videoconference. In this embodiment, when the sharing user turns off the document twin function, the document twin module 430 controls the document twins such that the other users are shown only what is currently shown in the sharing user's screenshare, meaning that the other users cannot navigate to other portions of their document twin. In this embodiment, when the sharing user turns on the document twin function, the document twin module 430 controls the document twins such that the other users are permitted to navigate to other portions of their document twin. This control by the sharing user is useful, for example, when the sharing user wishes to prevent the other users from looking ahead at other portions of the document during the presentation.

In accordance with aspects of the invention, the document twin module 430 is configured to allow one of the other users to flag a section (e.g., a page) of their document twin by providing input to the interface of the conference client application 420. In embodiments, when a participant provides input to flag a page of their document twin, the document twin module 430 creates a link that is displayed in the interface of the other participants and the interface of the sharing user. The link may be selected by one or more of the other participants to navigate their respective document twin to the flagged page. The link may be selected by the sharing user to navigate the screenshare to the flagged page. This is useful, for example, to provide the sharing user the ability to jump the screenshare to a particular page without requiring the participant to verbally explain the page they wish others to see.

In some embodiments, the document twin module 430 checks whether a participant user device (e.g., user device 405*b*) has a local copy of the document that is being shown in the screenshare by the sharing user (e.g., using user device 405*a*). For example, in some instances, the sharing user may have previously emailed the document to the other users. In this situation, the document twin module 430 does not need to create and maintain a document twin for any user that already has the document. In embodiments, the document twin module 430 determines whether a participant user device has the document by using an equivalent checksum between a document on the participant user device and the document that is being shown in the screenshare by the sharing user. If the participant user device already has the document, then the module may utilize web hooks to identify the portion currently shown in the screenshare so that the participant may be notified of the portion currently shown in the screenshare, e.g., similar to that shown in FIGS. 6A and 6B.

Implementations of the invention may be used to create document twins of documents such as word processing documents, spreadsheet documents, and Portable Document Format (PDF) style documents. For example, implementations of the invention may be used when the sharing user is presenting a PDF document in the screenshare of the videoconference, and the document twin module 430 may be configured to make document twins of the PDF document for the other participants of the videoconference. For example, embodiments may be used with a PDF vertical presentation file (e.g., portrait orientation) or alternatively with a with a PDF horizontal presentation file (e.g., landscape orientation). In another example, embodiments may be used with screensharing a spreadsheet with row and column scrolling pertaining to a file that has a single face dimensionality while in screensharing mode.

In accordance with aspects of the invention, the document twin module 430 records data that defines how long the other users spent on pages of their respective document twins. For example, as described herein, the document twin module 430 maintains data, in real-time, that defines a portion of the document twin that is currently shown in the interface of the conference client application 420 of each participant. Using this real-time data, the document twin module 430 may determine how much time a user spends displaying a particular page of their document twin. In embodiments, the document twin module 430 collects and stores this data as user viewing metrics. In one example, the user viewing metrics include a cumulative amount of time all users spent displaying a particular page (or page range) of the document twins. In another example, the user viewing metrics include a respective report for each user, the report indicating how much time this particular user spent displaying each particular page (or page range) of their document twin. Other metrics may also be collected in a similar manner. In embodiments, the document twin module 430 provides the metrics to the sharing user, e.g., after the videoconference ends. In this manner, the sharing user may review the metrics to determine, for example, audience interest in of certain pages (or page ranges) of the document.

In embodiments, the document twin module 430 deletes all the document twins when any one of the following events occurs: the sharing user turns off their screenshare; and the videoconference ends. This ensures that the document twins are ephemeral and not persisted, which provides the sharing user with control over the distribution of their document.

Figure 9:
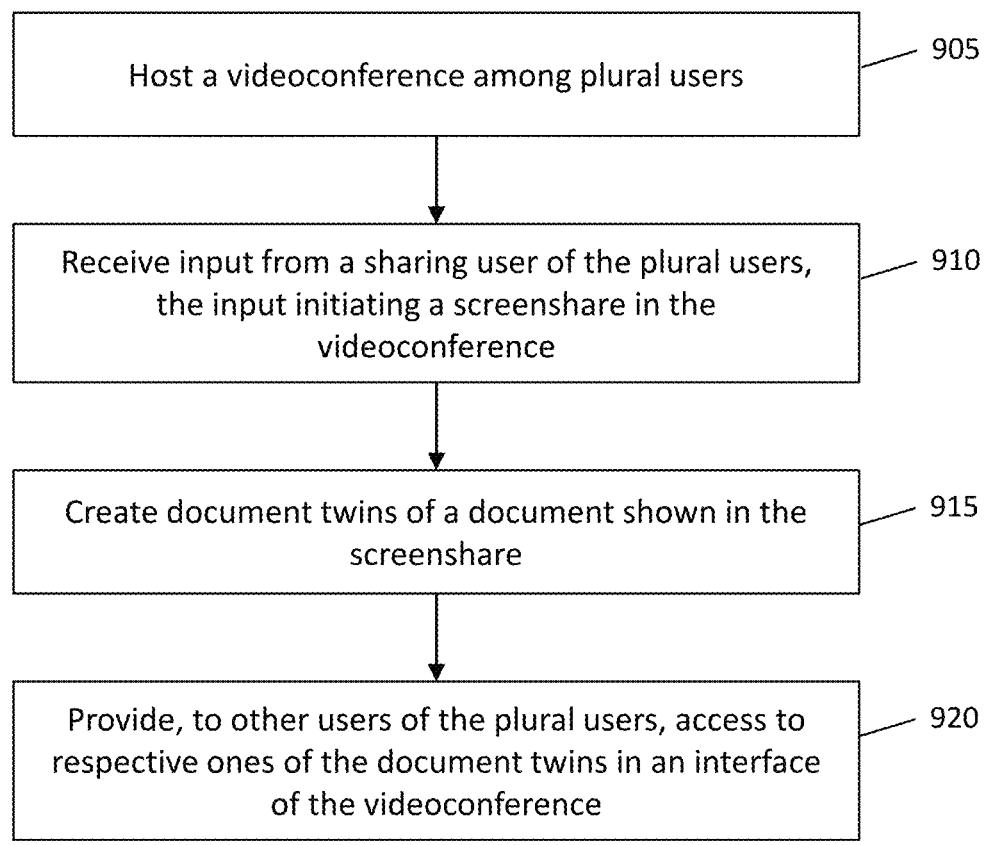
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIG. 4.

At step 905, the system hosts a videoconference among plural users. In embodiments, and as described with respect to FIG. 4, the conference server 410 hosts a videoconference among plural users, each of the users having one of user devices 405*a-n* that displays a videoconference interface (e.g., an interface of the conference client application 420).

At step 910, the system receives input from a sharing user of the plural users, wherein the input initiates a screenshare in the videoconference. In embodiments, and as described with respect to FIG. 4, one of the users participating in the videoconference provides input to their user device (e.g., user device 405*a*) to screenshare content with the other users of the videoconference. The input may be provided in the videoconference interface of their user device (e.g., user device 405*a*).

At step 915, the system creates document twins of a document shown in the screenshare. In embodiments, and as described with respect to FIG. 4, the document twin module 430 creates document twins of a document shown in the screenshare that was initiated in step 910. In embodiments, the document twin module 430 creates a respective document twin for each user in the videoconference other than the sharing user. In embodiments, each document twin is a digital copy of the document that is shown in the screenshare. In embodiments, the module creates the document twins based on data received from the user device of the sharing user (e.g., user device 405*a*). In embodiments, the document twins are ephemeral and read-only.

At step 920, the system provides the participants of the videoconference access to respective ones of the document twins. In embodiments, and as described with respect to FIG. 4, the document twin module 430 provides each of the other users (not including the sharing user) access to a respective one of the document twins. In embodiments, each of the other users may view their respective document twin in the videoconference interface of their user device (e.g., user devices 405*b-n*). In embodiments, each of the other users may scroll to different pages within their document twin independently of the other users and independently of the screenshare.

The method may further include providing, for a respective one of the document twins shown in a respective one of the interfaces of the videoconference, a visual indicator of content of the screenshare relative to the respective one of the document twins. For example, and as described with respect to FIGS. 6A and 6B, when a particular one of the other users is viewing their document twin in their videoconference interface, the document twin module 430 provides a visual indicator 600 of the current content of the screenshare relative to the document twin. In embodiments, the document twin module 430 generates the visual indicator 600 based on data obtained using web hooks.

The method may further include, in response to receiving a snap back input from the sharing user, automatically causing each of the respective ones of the document twins to scroll to a same portion of the document as currently shown in the screenshare. For example, and as described with respect to FIGS. 7A and 7B, the sharing user may provide an input (e.g., at control 720) that causes all the document twins of all the videoconference participants to snap back to the portion of the document that is currently shown in the screenshare of the sharing user.

The method may further include: receiving, from the sharing user, an input defining a number of pages; and limiting scrolling within the document twins based on the input defining the number of pages. In embodiments, the sharing user may provide input that defines a number of pages that the other users can navigate away from the page currently shown in the screenshare.

The method may further include: receiving, from the sharing user, an input defining an amount of time; and limiting scrolling within the document twins based on the input defining the amount of time. In embodiments, the sharing user may provide input that defines an amount of time that is used to limit the other users' navigation within their document twins The method may further include, in response to receiving a first toggle input disabling the document twins: causing all the document twins to scroll to a same portion of the document as currently shown in the screenshare; and preventing scrolling within all the document twins until such time as the sharing user provides a second toggle input enabling the document twins. In embodiments, the sharing user may provide input that selectively turns on and off (e.g., toggles on and off) the document twin function during a screenshare in the videoconference.

The method may further include: receiving input from one of the other users flagging a page in their respective one of the document twins; and creating a link in the interface of the videoconference of the sharing user, wherein selection of the link by the sharing user causes the screenshare to display the flagged page of the document. The method may further include: capturing viewing metrics of the other users relating to time spent viewing portions of the document twins; and providing the viewing metrics to the sharing user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
hosting, by a computing device, a videoconference among plural users;
receiving, by the computing device, input from a sharing user of the plural users, wherein the input initiates a screenshare in the videoconference;
creating, by the computing device, document twins of a document shown in the screenshare;
providing, by the computing device and to other users of the plural users, access to respective ones of the document twins in an interface of the videoconference,
wherein each of the other users may scroll within a respective one of the document twins independently of other ones of the other users and independently of the screenshare,
wherein the document twins are only accessible by the other users during a time in the videoconference controlled by the user that shared the document in the screenshare, the document twin being read-only, meaning that the other users cannot save a copy of the document twin and cannot edit the document twin; and
providing, for a respective one of the document twins shown in a respective one of the interfaces of the videoconference, a visual indicator of a portion of current content of the screenshare on a same screen in conjunction with a portion of one of the document twins which has been moved away from the current content, wherein the visual indicator identifies only the portion of the current content that overlaps the portion of one of the document twins which has been moved away from the current content, wherein the visual indicator disappears when the respective one of document twins has no overlap with the content of the screenshare of the videoconference.

2. The method of claim 1, further comprising generating the visual indicator based on data obtained using web hooks.

3. The method of claim 1, further comprising, in response to receiving a snap back input from the sharing user, automatically causing each of the respective ones of the document twins to scroll to a same portion of the document as currently shown in the screenshare.

4. The method of claim 1, further comprising:
receiving, from the sharing user, an input defining a number of pages; and
limiting scrolling within the document twins based on the input defining the number of pages.

5. The method of claim 1, further comprising:
receiving, from the sharing user, an input defining an amount of time; and
limiting scrolling within the document twins based on the input defining the amount of time.

6. The method of claim 1, further comprising, in response to receiving a first toggle input disabling the document twins:
causing all the document twins to scroll to a same portion of the document as currently shown in the screenshare; and
preventing scrolling within all the document twins until such time as the sharing user provides a second toggle input enabling the document twins.

7. The method of claim 1, further comprising:
receiving input from one of the other users flagging a page in their respective one of the document twins; and
creating a link in the interface of the videoconference of the sharing user, wherein selection of the link by the sharing user causes the screenshare to display the flagged page of the document.

8. The method of claim 1, further comprising:
capturing viewing metrics of the other users relating to time spent viewing portions of the document twins; and
providing the viewing metrics to the sharing user.

9. A computer program product comprising one or more computer readable storage media having program instructions collectively stored on the one or more computer readable storage media, the program instructions executable to:
host a videoconference among plural users;
receive input from a sharing user of the plural users, wherein the input initiates a screenshare in the videoconference;
create document twins of a document shown in the screenshare;
provide, to other users of the plural users, access to respective ones of the document twins in an interface of the videoconference,
wherein each of the other users may scroll within a respective one of the document twins independently of other ones of the other users and independently of the screenshare,
wherein the document twins are only accessible by the other users during a time in the videoconference controlled by the user that shared the document in the screenshare, the document twin being read-only, meaning that the other users cannot save a copy of the document twin and cannot edit the document twin; and
provide, for a respective one of the document twins shown in a respective one of the interfaces of the videoconference, a visual indicator of a portion of current content of the screenshare on a same screen in conjunction with a portion of one of the document twins which has been moved away from the current content, wherein the visual indicator identifies only the portion of the current content that overlaps the portion of one of the document twins which has been moved away from the current content, wherein the visual indicator disappears when the respective one of document twins has no overlap with the content of the screenshare of the videoconference.

10. The computer program product of claim 9, wherein the program instructions are executable to cause, in response to receiving a snap back input from the sharing user, each of the respective ones of the document twins to scroll to a same portion of the document as currently shown in the screenshare.

11. The computer program product of claim 9, wherein the program instructions are executable to:
receive, from the sharing user, an input defining a number of pages; and
limit scrolling within the document twins based on the input defining the number of pages.

12. The computer program product of claim 9, wherein the program instructions are executable to:
receive, from the sharing user, an input defining an amount of time; and
limit scrolling within the document twins based on the input defining the amount of time.

13. The computer program product of claim 9, wherein the program instructions are executable to:
receive a first toggle input disabling the document twins;
cause all the document twins to scroll to a same portion of the document as currently shown in the screenshare; and
prevent scrolling within all the document twins until such time as the sharing user provides a second toggle input enabling the document twins.

14. The computer program product of claim 9, wherein the program instructions are executable to:
capture viewing metrics of the other users relating to time spent viewing portions of the document twins; and
provide the viewing metrics to the sharing user.

15. A system comprising:
a processor, a computer readable memory, one or more computer readable storage media, and program instructions collectively stored on the one or more computer readable storage media, the program instructions executable to:
host a videoconference among plural users;
receive input from a sharing user of the plural users, wherein the input initiates a screenshare in the videoconference;
create document twins of a document shown in the screenshare;
provide, to other users of the plural users, access to respective ones of the document twins in an interface of the videoconference,
wherein each of the other users may scroll within a respective one of the document twins independently of other ones of the other users and independently of the screenshare,
wherein the document twins are only accessible by the other users during a time in the videoconference controlled by the user that shared the document in the screenshare, the document twin being read-only, meaning that the other users cannot save a copy of the document twin and cannot edit the document twin; and
provide, for a respective one of the document twins shown in a respective one of the interfaces of the videoconference, a visual indicator of a portion of current content of the screenshare on a same screen in conjunction with a portion of one of the document twins which has been moved away from the current content, wherein the visual indicator identifies only the portion of the current content that overlaps the portion of one of the document twins which has been moved away from the current content, wherein the visual indicator disappears when the respective one of document twins has no overlap with the content of the screenshare of the videoconference.

* * * * *